(12) United States Patent
Knodt

(10) Patent No.: US 10,198,160 B2
(45) Date of Patent: Feb. 5, 2019

(54) APPROACH FOR PROCESSING AUDIO DATA AT NETWORK SITES

(71) Applicant: Kurt Knodt, Palo Alto, CA (US)

(72) Inventor: Kurt Knodt, Palo Alto, CA (US)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 15/171,705

(22) Filed: Jun. 2, 2016

(65) Prior Publication Data

US 2017/0351405 A1 Dec. 7, 2017

(51) Int. Cl.
| | | |
|---|---|---|
| *G06F 3/0484* | (2013.01) | |
| *G10L 15/26* | (2006.01) | |
| *G06F 3/16* | (2006.01) | |
| *G10L 15/08* | (2006.01) | |

(52) U.S. Cl.
CPC .......... *G06F 3/04842* (2013.01); *G06F 3/167* (2013.01); *G10L 15/26* (2013.01); *G10L 2015/088* (2013.01)

(58) Field of Classification Search
CPC .. G06F 3/04842; G06F 3/04817; G06F 3/167; G10L 15/08; G10L 15/26; G10L 2015/088
See application file for complete search history.

(56) References Cited

U.S. PATENT DOCUMENTS

| | | | | |
|---|---|---|---|---|
| 6,031,526 A | * | 2/2000 | Shipp | G06F 19/321 |
| | | | | 715/201 |
| 6,441,836 B1 | * | 8/2002 | Takasu | G06F 15/0266 |
| | | | | 709/201 |
| 9,666,208 B1 | * | 5/2017 | Rubin | G06F 17/21 |
| 9,880,807 B1 | * | 1/2018 | Haggerty | H04M 11/00 |
| 2002/0059333 A1 | * | 5/2002 | Tribbeck | G06F 17/30707 |
| | | | | 715/273 |
| 2008/0071612 A1 | * | 3/2008 | Mah | G06Q 30/02 |
| | | | | 705/14.73 |
| 2013/0268850 A1 | * | 10/2013 | Kyprianou | G06F 17/24 |
| | | | | 715/255 |
| 2013/0332162 A1 | * | 12/2013 | Keen | G10L 15/26 |
| | | | | 704/235 |
| 2015/0269935 A1 | * | 9/2015 | Suessenguth | G06F 17/273 |
| | | | | 704/235 |
| 2015/0371637 A1 | * | 12/2015 | Neubacher | G10L 15/26 |
| | | | | 704/235 |

* cited by examiner

*Primary Examiner* — Dino Kujundzic
(74) *Attorney, Agent, or Firm* — Hickman Palermo Becker Bingham LLP; Edward A. Becker

(57) ABSTRACT

Several approaches are provided for processing audio data to generate transcription data that is supplemented with visual content items. The visual content items may be any type of data that may vary depending upon a particular implementation. Examples of visual content items include, without limitation, images, videos, symbols, etc. Embodiments include adding visual content items to transcription data based upon user input, specialized keywords contained in the transcription data and various correspondences with the audio data, including time-based correspondence and correspondences based upon a common user, storage location or logical entity.

20 Claims, 5 Drawing Sheets

Revised Transcription Data 420

"Patient suffers from condition X as indicated in image [Image] and X-rays [X-ray] [X-ray] Recommend follow-up in two weeks"

Audio Data 300

"Patient suffers from condition X as indicated in image. Recommend follow-up in two weeks."

Transcription Data 310

"Patient suffers from condition X as indicated in image. Recommend follow-up in two weeks."

Revised Transcription Data 320

"Patient suffers from condition X as indicated in image. Recommend follow-up in two weeks."

FIG. 4A

T1    Audio Data 400    T5    T6    T10

"Patient suffers from condition X as indicated in image VisiLink 123456 and X-rays VisiLink 123457 123458 Recommend follow-up in two weeks"

FIG. 4B

Transcription Data 410

"Patient suffers from condition X as indicated in image VisiLink 123456 and X-rays VisiLink 123457 123458 Recommend follow-up in two weeks"

FIG. 4C

Revised Transcription Data 420

"Patient suffers from condition X as indicated in image [Image] and X-rays [X-ray] [X-ray] Recommend follow-up in two weeks"

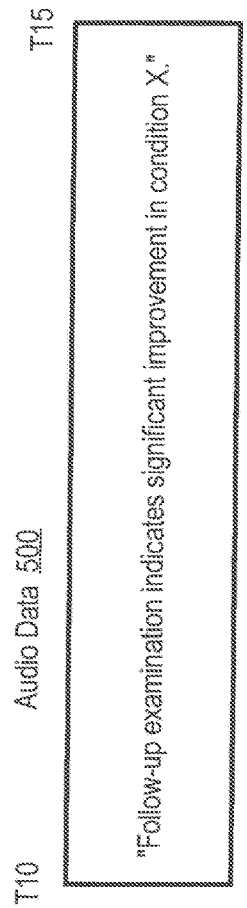

FIG. 5A

Audio Data 500

"Follow-up examination indicates significant improvement in condition X."

FIG. 5B

Transcription Data 510

"Follow-up examination indicates significant improvement in condition X."

FIG. 5C

Revised Transcription Data 520

"Follow-up examination indicates significant improvement in condition X."

| Item | Visual Content Item ID | Time | Type |
|---|---|---|---|
| 1 | 123456 | T1 | X-ray |
| 2 | 123457 | T13 | Image |
| 3 | 123458 | T20 | Image |
| 4 | A85JXz | T9 | Video |
| 5 | T-43uY | T50 | Image |

Visual Content Item Data 530

APPROACH FOR PROCESSING AUDIO DATA AT NETWORK SITES

FIELD OF THE INVENTION

Embodiments relate generally to processing audio data at network sites. SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Audio recording capabilities are now available in many different types of electronic devices. For example, audio recording capabilities are available in small, portable, stand-alone audio recording devices, and also in many types of consumer electronic and telephony devices, such as smartphones. The portability of these devices allows users to easily record audio from almost any location. In addition, many audio-to-text transcription services are now available via the Internet, providing a convenient and inexpensive way for users to obtain text-based transcriptions of audio data. One of the issues with conventional audio recording devices and audio-to-text transcription is that it is difficult to acquire and add visual content, such as images, video, etc., to the resulting text. Audio data and visual content are acquired separately, sometimes using separate devices, and the resulting data remains separate, leading to an unfavorable user experience.

SUMMARY

An apparatus is provided for processing audio data to generate transcription data that is supplemented with visual content items. The apparatus comprises one or more processors and one or more memories that store instructions which, when processed by the one or more processors, cause the apparatus to perform various functionality, including retrieving audio data that represents a plurality of spoken words, causing the audio data to be processed to generate transcription data that provides a textual representation of the audio data, identifying one or more specified keywords contained in the transcription data, wherein each specified keyword from the one or more specified keywords indicates a location in the transcription data where a visual content item is to be added to the transcription data, and generating revised transcription data by adding a visual content item or a reference to the visual content item. The approach may also be implemented by one or more computer-implemented methods or one or more non-transitory computer-readable media that store instructions which, when processed by one or more processors, cause the functionality to be performed.

BRIEF DESCRIPTION OF THE DRAWINGS

In the figures of the accompanying drawings like reference numerals refer to similar elements.

FIG. 4A depicts example audio data.

FIG. 4B depicts example transcription data.

FIG. 4C depicts example revised transcription data.

FIG. 5A depicts example audio data.

FIG. 5B depicts example transcription data.

FIG. 5C depicts example revised transcription data.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. System Architecture
III. Processing Audio Data and Adding Visual Content Items
  A. Adding Visual Content Items to Transcription Data
  B. Specialized Keywords
  C. Adding Visual Content Items Based Upon Time
IV. Implementation Examples

I. Overview

Several approaches are provided for processing audio data to generate transcription data that is supplemented with visual content items. The visual content items may be any type of data that may vary depending upon a particular implementation. Examples of visual content items include, without limitation, images, videos, symbols, etc. Embodiments include adding visual content items to transcription data based upon user input, specialized keywords contained in the transcription data and various correspondences with the audio data, including time-based correspondence and correspondences based upon a common user, storage location or logical entity.

II. System Architecture

Figure 2:
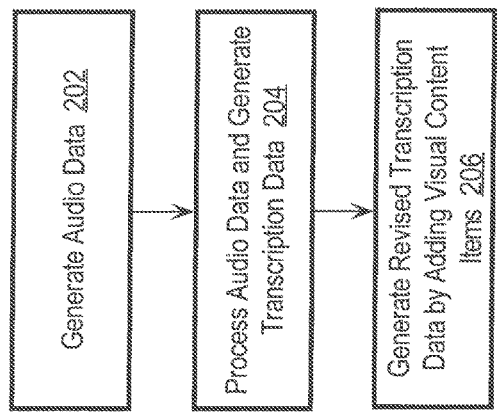
FIG. 2 is a flow diagram that depicts an approach for processing audio data.
Figure 1:
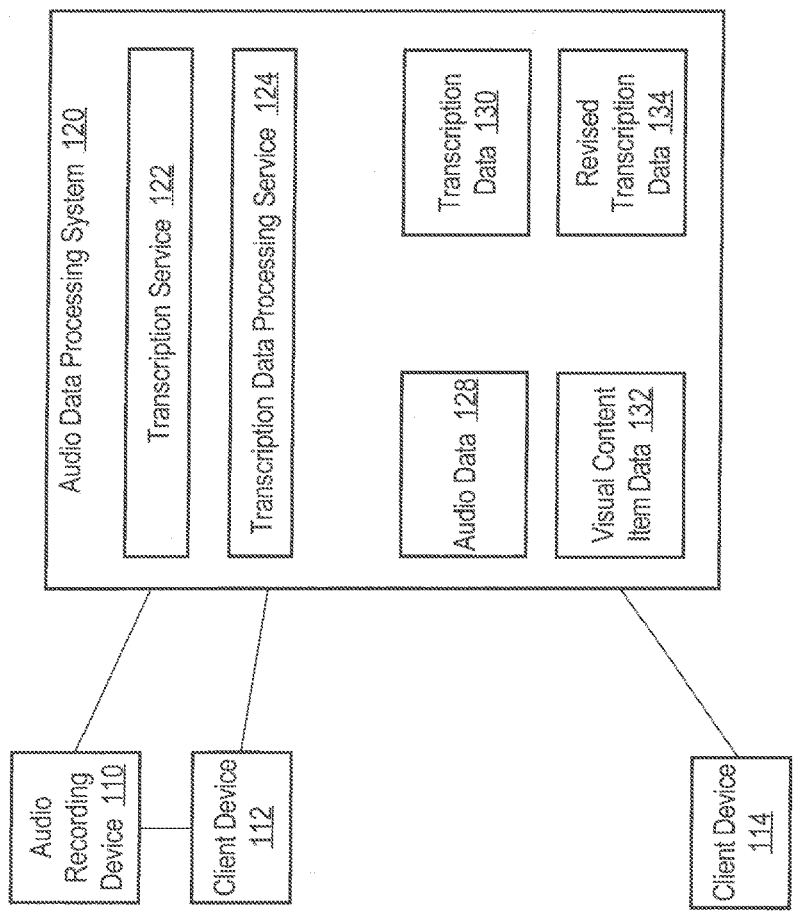
FIG. 1 is a block diagram that depicts an arrangement for processing audio data.

FIG. 1 is a block diagram that depicts an arrangement 100 for processing audio data. Arrangement 100 includes an audio recording device 110, client devices 112, 114 and an audio data processing system 120. All of the elements depicted in FIG. 1 may be communicatively coupled with each other via one or more direct and/or indirect communications links. The communications links may be implemented by any number and type of wired or wireless networks, such as local area networks (LANs), wide area networks (WANs), the Internet, etc. Arrangement 100 may include fewer elements or more elements than depicted in FIG. 1, depending upon a particular implementation.

Audio recording device 110 is a device that is capable of recording human speech and generating audio data that represents the human speech. The audio data may be in any audio format that may vary depending upon a particular implementation, and embodiments are not limited to any particular audio format. Examples of audio formats include, without limitation, Windows Media Audio (.wma), WAV (.wav), Real Audio (.ra, .ram, .rm), Musical Instrument Digital Interface (.mid), and Ogg (.ogg). Audio recording device 110 may be implemented, for example, as a stand-alone recorder, or as a feature of a multi-feature device, such as a camera, mobile phone, tablet computing device, personal digital assistant (PDA), etc. Alternatively, audio recording device 110 may be integrated into a client device, such as client device 112. Embodiments are also applicable to audio recording device 110 being capable of recording audio as part of video content. Example formats include, without limitation, .mp4 and .mov.

Client devices 112, 114 may be implemented by any type of client device and embodiments are not limited to particular types of client devices. Examples of client devices 112, 114 include, without limitation, a mobile communications device such as a smart phone, a tablet computing device, a personal digital assistant, a laptop computer, a desktop computer, a workstation, etc.

Audio data processing system 120 is a system that provides processing of audio data as described herein. This includes causing audio data to be processed to generate transcription data that provides a textual representation of the audio data, and generating revised transcription data by adding visual content items to the transcription data, as described in more detail hereinafter. Audio data processing system 120 may be implemented by computer hardware, computer software, or any combination of computer hardware and computer software. In the example depicted in FIG. 1, audio data processing system 120 includes a transcription service 122 that is configured to process audio data 128 and generate transcription data 130 that provides a textual representation of spoken words in the audio data. Transcription data 130 may be in any format that may vary depending upon a particular implementation and embodiments are not limited to transcription data being in any particular format. Example formats include, without limitation, plain text, rich text, etc. Audio data processing system 120 also includes a transcription data processing service 124 that is configured to process transcription data 130 and generate revised transcription data 134 by adding display content items, represented by visual content item data 132, to transcription data 130.

III. Processing Audio Data and Adding Visual Content Items

A variety of approaches may be implemented to supplement transcription data with display content item data. Several example approaches are described hereinafter.

A. Adding Visual Content Items to Transcription Data

According to one embodiment, visual content items are added to transcription data based upon a correspondence between audio data and visual content items. The correspondence may exist due to a wide variety of factors that may vary depending upon a particular implementation. Example factors that may establish a correspondence between audio data and visual content items include, without limitation, one or more of a user, a storage location, or a logical entity in common with both audio data and visual content items. Both audio data and visual content items may be generated by the same user as indicated, for example, by metadata for the audio data and the visual content items. For example, audio data may represent a recording of notes dictated by a physician for a particular patient. Both the audio data and visual content items, such as images, X-rays, etc., may correspond to the particular patient by a patient identifier for the particular patient. As another example, audio data and visual content items may be stored in the same location or correspond to the same project, group or organization. In the prior example, both the audio data and the visual content items may be stored in a folder or directory for the particular patient. Visual content items may be added to transcription data at specified locations, such as the beginning, middle, or end of transcription data. The specified locations may be specified by an administrative user or a user who acquires the audio data.

Figure 3A:
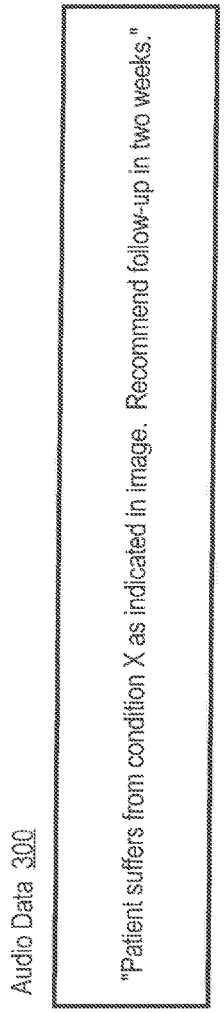
FIG. 3A depicts example audio data.
Figure 3B:
FIG. 3B depicts example transcription data.
Figure 3C:
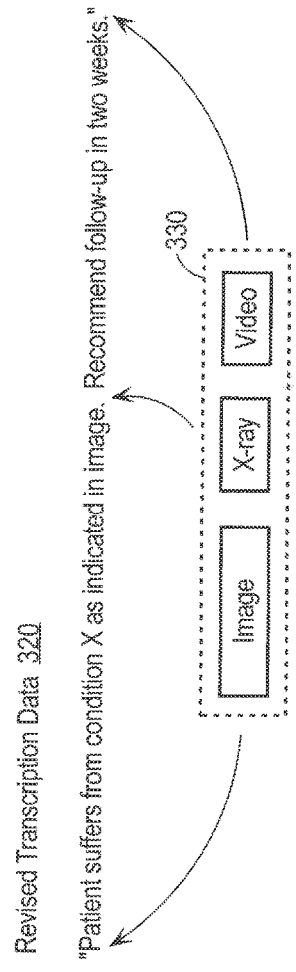
FIG. 3C depicts example revised transcription data.

Consider the following example with reference to FIG. 1, the flow diagram 200 of FIG. 2 and FIGS. 3A-3C. In step 202, audio data is generated. For example, a physician may use audio recording device 110 to dictate notes pertaining to a particular patient and audio recording device 110 generates audio data 300 (FIG. 3A). In this example, the physician dictates the phrase "Patient suffers from condition X as indicated in image. Recommend follow-up in two weeks." It is presumed that audio data 300 generated by audio recording device 110 is transmitted to audio data processing system 120 and stored in audio data 202, for example, as a particular audio file. This may be accomplished, for example, by the physician selecting an option on audio recording device 110 to upload audio data 300 to audio data processing system 120. This may be done directly from audio recording device 110 to audio data processing system 120, or via client device 112.

In step 204, audio data 300 is processed and transcription data 310 (FIG. 3B) is generated from audio data 300. For example, transcription service 122 may process audio data 300 and generate transcription data 310 that is a text-based representation of audio data 300. In the present example, transcription data 310 provides a textual representation of the notes dictated by the physician. Transcription data 310 may be stored as part of transcription data 130, for example as a transcription data file, and may be in any of a wide variety of formats that may vary depending upon a particular implementation. For example, transcription data 310 may be in a text-based format or a rich text-based format.

In step 206, revised transcription data 320 (FIG. 3C) is generated by adding one or more visual content items 330 to transcription data 310. For example, transcription data processing service 124 may add one or more visual content items 330, represented by visual content item data 132, to transcription data 310 to generate revised transcription data 320 that is stored in revised transcription data 134. Visual content items 330 may include, for example, medical records, images, video content, etc. In the current example, revised transcription data 320 may include both the notes dictated by the physician, as well as one or more images, such as photos, X-rays, MRIs, other scans, etc., for the particular patient. Visual content items 330 may be added to any location in the revised transcription data 134, for example, at the beginning or end, or at one or more other specified locations. Revised transcription data 320 generated in step 206 may be in a format that is the same or different than transcription data 310. The way in which visual content items are added to revised transcription data 320 may vary depending upon a particular implementation and the format of revised transcription data 320. For example, some data formats may natively support both text and image data and for these formats, visual content items in the form of image data may be added to the revised transcription data 320 without requiring any special formatting. Other data formats may require special formatting or data conversions to be applied, either to the text, the visual content items, or both the text and the visual content items. This may also be applicable to other types of visual content items, such as video-based visual content items.

As an alternative to adding visual content items to the revised transcription data 220, a reference or link to visual content items may be used instead. In the prior example, instead of the X-ray image, a reference to the X-ray image may be added to the revised transcription data 220. The reference may be, for example, an address such as a URI.

According to one embodiment, the visual content items to be added to transcription data may be specified by a user. For example, transcription data processing service 124 may provide a graphical user interface that allows a user to select visual content items to be added to transcription data. The graphical user interface may also display transcription data and provide a visual indication of one or more locations where visual content items are to be added to the transcription data, and also provide controls that allow a user to select visual content items that are to be added at the one or more locations. The controls may allow a user to navigate to a location of stored visual content items and select particular visual content items to be included in the revised transcription data 220. As a further enhancement, the graphical user interface controls may direct a user to visual content items that correspond to the audio data 200. In the prior example, the user may be directed to a location that stores visual content for the particular patient.

B. Specialized Keywords

According to one embodiment, specialized keywords, also referred to herein as "specified keywords," are used to specify locations where visual content items are inserted into transcription data. The specialized keywords may be any spoken word, or combination of words, that are capable of being recognized in transcription data. The specialized keywords may be words that have meaning in a particular language, or they may be words that do not have any meaning in a particular language.

In the prior example, the physician may speak the specialized keyword "VisiLink" while dictating the notes for the particular patient. The transcription data includes the keyword "VisiLink" at the location in the text where the physician spoke the keyword "VisiLink." The transcription data processing service 124 inserts the visual content items in the revised transcription data 134 at the location of the keyword "VisiLink." The visual content data may be inserted into the revised transcription data 134 before or after the specialized keyword "VisiLink," or may replace the specialized keyword "VisiLink" with the visual content data by inserting the visual content data at the location of the specialized keyword "VisiLink" and remove the specialized keyword "VisiLink." This use of specialized keywords allows an end user to specify where visual content items are added to transcription data.

According to one embodiment, specialized keywords are accompanied by visual content identification data that identifies visual content items to be added to transcription data. The visual content identification data may identify visual content items directly, for example, by name. Alternatively, the visual content identification data may indirectly identify visual content items, for example, by a reference or a location. Visual content identification data may take many forms and may vary depending upon a particular implementation. Example implementations of visual content identification data include, without limitation, names, filenames, identifiers, signatures, random numbers, guaranteed unique numbers, alphanumeric codes, etc.

Visual content identification data may be generated using a wide variety of techniques that may vary depending upon a particular implementation. According to one embodiment, a user of a device that acquires or creates visual content items, such as a camera, tablet computing device, smart phone, personal digital assistant (PDA), etc., may be configured to allow a user to manually specify visual content identification data for a visual content item. Referring to the prior example of the specialized keyword "VisiLink," the device may include an "Add VisiLink" physical or graphical user interface control which, when selected, allows a user to manually enter visual content identification data for a visual content item that is about to be acquired, or that has previously been acquired. The user may determine the visual content identification data, or the visual content identification data may be determined by other personnel, such as assistants, etc. For example, in the medical context, visual content identification data may be determined by other physicians, clinicians, etc.

According to another embodiment, a device that acquires or creates visual content items may be configured to generate visual content identification data. This may be done automatically for every visual content item acquired, or may be manually requested by a user. For example, the device may include a "Generate VisiLink" control or button which, when selected, causes the generation of visual content identification data. The device itself may generate the visual content identifier or alternatively, the device may retrieve the visual content identifier from a remote location, for example, a server.

According to one embodiment, visual content identification data may be included in visual content items. For example, visual content identification data, e.g., in the form of a unique identifier, may be included directly in a visual content item, such as an image. The visual content identification data included in the visual content item may be in human-readable form. Alternatively, the visual content identification data may be in machine-readable form, such as encoded in a bar code, QR code, one or more other symbols, etc.

Visual content identification data may be unique to each visual content item, for example, by using long numbers, alphanumeric codes, signatures, etc. Alternatively, visual content identification data may only need to be unique with respect to other visual content items associated with a particular logical entity, such as a patient. This allows shorter visual content identifiers to be used.

The visual content identifier may be provided to audio data processing system 120 separate from the corresponding visual content item, or included with the corresponding visual content item, for example, in metadata for the corresponding visual content item.

Referring again to the prior example, suppose that the physician wants to add an X-ray for the particular patient into the transcription data. While dictating his notes, the physician speaks the specialized keyword "VisiLink," followed by "123456" at the location where the physician would like the X-ray to be added. The "123456" is one non-limiting example of visual content identification data that identifies the visual content item(s) to be added to the transcription data. In the present example, the visual content identification data "123456" identifies the X-ray for the particular patient that the physician would like to add to the transcript. When the revised transcription data 134 is generated, the X-ray is added at the location of the specialized keyword "VisiLink." For example, transcription data processing service 124 may locate, for example in visual content item data 132, the visual content item that corresponds to the visual content identification data "123456,"

and add the visual content item to the revised transcription data. Alternatively, transcription data processing service 124 may locate the visual content item in a location external to audio data processing system 120. This approach allows an individual to verbally specify both the visual content items that are to be included in a transcription and the locations of those visual content items. Any number of visual content items may be specified with a single set of one or more specialized keywords. In the prior example, visual content identification data for a single visual content item follows the "VisiLink" specialized keyword for purposes of explanation, but visual content identification data for multiple visual content items may follow a specialized keywords. This may be useful in situations where a user wishes to have multiple visual content items inserted into the transcription data at a particular location.

FIGS. 4A-4C depict an approach for supplementing transcription data with visual content items, according to an embodiment. In FIG. 4A, a user, which in this example is a physician, uses audio recording device 110 to dictate notes pertaining to a particular patient and wants to add visual content items to the transcription data. In this example, the physician dictates the phrase "Patient suffers from condition X as indicated in image VisiLink 123456 and X-rays VisiLink 123457 123458 Recommend follow-up in two weeks." The audio recording device 110 used by the physician generates audio data 400 that is transmitted to audio data processing system 120 and stored in audio data 128. Audio data 400 covers a time period T1-T10 and the specialized keyword "VisiLink" was spoken by the physician at time T5, followed by the visual content identification "123456" and at time T6, followed by the visual content identifications "123457" and "123458."

FIG. 4B depicts transcription data 410 that is generated by transcription service 122 after processing audio data 400 to generate transcription data 410 that provides a textual representation of audio data 400. The transcription data 410 includes the specialized keyword "VisiLink" and the visual content item identification data "123456," "123457" and "123458."

FIG. 4C depicts revised transcription data 420 generated by transcription data processing service 124 in which the specialized keywords and visual content item identification data have been replaced with the corresponding visual content items. More specifically, the specialized keyword "VisiLink" and visual content item identification data "123456" have been replaced with an image, and the specialized keyword "VisiLink" and visual content item identification data "123457" and "123458" have been replaced with two X-rays.

C. Adding Visual Content Items Based Upon Time

According to one embodiment, time-based correspondence is used to add visual content items to transcription data. This may include adding to transcription data, a visual content item that has a time that corresponds to a time of the audio data that was transcribed. For example, the visual content item may have an acquisition or creation time that is within a time range covered by the audio data that was transcribed. As another example, a visual content item may have an acquisition or creation time that is within a specified amount of time of a time range covered by audio data that was transcribed. The specified amount of time may be selected so that a reasonable correspondence is established between visual content items and audio data.

FIGS. 5A-5C depict an approach for supplementing transcription data with visual content items based upon time, according to an embodiment. In FIG. 5A, a user, which in this example is a physician, uses audio recording device 110 to dictate notes pertaining to a particular patient and wants to add visual content items to the transcription data. In this example, the physician dictates the phrase "Follow-up examination indicates significant improvement in condition X." The audio recording device 110 used by the physician generates audio data 500 that is transmitted to audio data processing system 120 and stored in audio data 128. Audio data 500 covers a time period T10-T15. As used herein, the notation "T" may represent any unit of time, for example, seconds, minutes, hours, etc.

FIG. 5B depicts transcription data 510 that is generated by transcription service 122 after processing audio data 500 to provide a textual representation of audio data 500. The transcription data 510 provides the textual representation for the sentence "Follow-up examination indicates significant improvement in condition X."

FIG. 5C depicts revised transcription data 520 generated by transcription data processing service 124 in which visual content items have been added to transcription data. The visual content items may be added at any location in revised transcription data 520. In FIG. 5C, arrows indicate example locations where visual content items may be added. Visual content item data 530 includes data for five visual content items, where each row corresponds to a particular visual content item. Each visual content item has an item number in the form of an integer, a visual content item identifier (ID) in the form of an alphanumeric string, an acquisition or creation time, and a type, such as image, X-ray, video, etc.

According to one embodiment, visual content items having a creation time that is within the time range covered by audio data 500 are included in revised transcription data 520. In the present example, visual content item 2 has a creation time of T13 that is within the T10-T15 time range covered by audio data 500 and is therefore included in revised transcription data 520. According to another embodiment, visual content items that have an acquisition or creation time that is within a specified amount of the time range covered by audio data 500 are included in revised transcription data 520. For example, suppose that the specified amount, which may also be considered to be a threshold, is set at 5. In this example, the third and fourth visual content items represented in visual content item data 530 would also be included in revised transcription data 500, because the acquisition or creation times of T20 and T9, respectively, are within 5 units of the T10-T15 time range covered by audio data 500. The specified amount or threshold may be selected to provide useful results in various contexts. A specified time or threshold that is too short may miss some visual content items, while a specified time or threshold that is too long may cause visual content items to be incorrectly associated with audio data. For example, suppose that in a medical context, the typical dictation made by a physician is tens of seconds to a few minutes in duration. In this situation, the specified time or threshold may be set to five or ten minutes so that visual content items will be associated with the correct corresponding audio data for a patient, while providing adequate discrimination between patients. In this example, using a specified time or threshold that is too short may cause some visual content items to be missed, i.e., not associated with a patient, while using a specified time or threshold that is too long may cause some visual content items to be associated with audio data for another patient.

Visual content items may be added at a single location in revised transcription data 520, or at multiple locations within revised transcription data 520. For example, visual content items may be grouped together at the beginning or end of revised transcription data 520. According to one embodiment, visual content items are added to locations in revised transcription data 520 that correspond to the acquisition or creation time of the visual content items. For example, visual content item number two would be added to revised transcription data 520 at a location that corresponds to time T13. This may be accomplished, for example, by determining times at which each of the words in revised transcription data 520 occurred in audio data 500, and then inserting the visual content item at the appropriate location.

IV. Implementation Examples

Although the flow diagrams of the present application depict a particular set of steps in a particular order, other implementations may use fewer or more steps, in the same or different order, than those depicted in the figures. The embodiments described herein provide user friendly and flexible approaches for adding visual content items to transcription data. The approaches allow visual content items to be automatically added to transcription data based upon user input, specialized keywords contained in the transcription data and various correspondences with the audio data, including time-based correspondence and correspondences based upon a common user, storage location or logical entity. The approaches also improve the performance of computers on which the approaches are implemented at least by reducing the amount of computational resources required to generate revised transcription data that includes visual content items.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
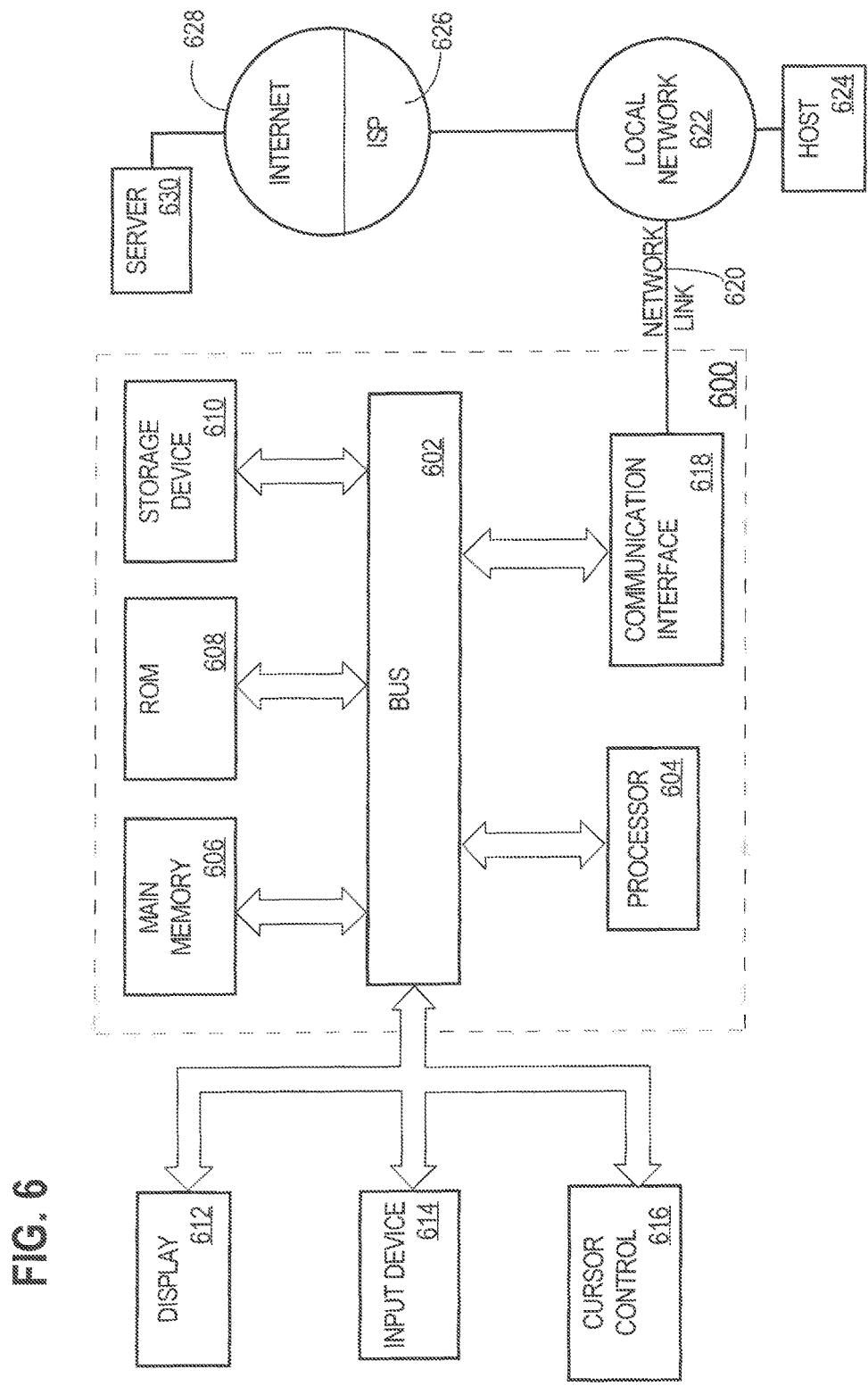
FIG. 6 is a block diagram that depicts an example computer system upon which embodiments may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 processing instructions stored in main memory 606. Such instructions may be read into main memory 606 from another non-transitory computer-readable medium, such as storage device 610. Processing of the instructions contained in main memory 606 by processor 604 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 600, various computer-readable media are involved, for example, in providing instructions to processor 604 for execution. Such media may take many forms, including but not limited to, non-volatile and volatile non-transitory media. Non-volatile non-transitory media includes, for example, optical or magnetic disks, such as storage device 610. Volatile non-transitory media includes dynamic memory, such as main memory 606. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 604. For example, the instructions may initially be stored on a storage medium of a remote computer and transmitted to computer system 600 via one or more communications links. Bus 602 carries the data to main memory 606, from which processor 604 retrieves and processes the instructions. The instructions received by main memory 606 may optionally be stored on storage device 610 either before or after processing by processor 604.

Computer system 600 also includes a communication interface 618 coupled to bus 602. Communication interface 618 provides a communications coupling to a network link 620 that is connected to a local network 622. For example, communication interface 618 may be a modem to provide a data communication connection to a telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be processed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors;
   one or more memories storing instructions which, when processed by the one or more processors, cause the apparatus to:
   retrieve audio data that represents a plurality of spoken words,
   cause the audio data to be processed to generate transcription data that provides a textual representation of the audio data,
   identify one or more specified keywords contained in the transcription data, wherein each specified keyword from the one or more specified keywords indicates a location in the transcription data where a visual content item is to be added to the transcription data,
   display, via a user interface, the transcription data and visually indicate one or more locations in the transcription data that correspond to the one or more specified keywords,
   provide user interface controls that allow a user to specify a visual content item or a link to a visual content item for each of the one or more locations in the transcription data, and
   generate revised transcription data that includes the visual content item or a reference to the visual content item at each of the one or more locations in the transcription data.

2. The apparatus of claim 1, wherein the transcription data contains visual content identification data that identifies a visual content item to be added to the revised transcription data.

3. The apparatus of claim 2, wherein the visual content identification data is adjacent to a specified keyword.

4. The apparatus of claim 2, wherein the visual content identification data is included in the visual content item or was generated by a device that acquired the visual content item.

5. The apparatus of claim 1, wherein a location in the revised transcription data of the added visual content item or link to the visual content item corresponds to one or more locations of the one or more specified keywords.

6. The apparatus of claim 1, wherein the user interface is implemented on a client device that is separate from the apparatus.

7. The apparatus of claim 1, wherein:
   the audio data corresponds to a plurality of visual content items or a plurality of references to visual content items based upon time, and
   the user interface controls allow the user to select the visual content item or the reference to the visual content item for each of the one or more locations in the transcription data from the plurality of visual content items or the plurality of references to visual content items.

8. The apparatus of claim 7, wherein the audio data corresponds to the plurality of visual content items or the plurality of references to the visual content items based upon a time for each visual content item from the plurality of visual content items having a specified time that is within a time range covered by the audio data.

9. The apparatus of claim 1, wherein:
   the audio data corresponds to a plurality of visual content items or a plurality of references to visual content items, and
   the user interface controls allow the user to select the visual content item or the reference to the visual content item for each of the one or more locations in the transcription data from the plurality of visual content items or the plurality of references to visual content items.

10. The apparatus of claim 9, wherein the audio data corresponds to the plurality of visual content items or the plurality of references to visual content items based upon one or more of a user in common, a storage location in common, or a logical entity in common.

11. The apparatus of claim 1, wherein the one or more memories store additional instructions which, when processed by the one or more processors, cause the apparatus to:
   remove the one or more specified keywords from the revised transcription data.

12. The apparatus of claim 1, wherein the plurality of visual content items includes one or more of one or more images, or one or more video clips.

13. One or more non-transitory computer-readable media storing instructions which, when processed by one or more processors, cause:
   at a computing device retrieving audio data that represents a plurality of spoken words, causing the audio data to be processed to generate transcription data that provides a textual representation of the audio data, identifying one or more specified keywords contained in the transcription data, wherein each specified keyword from the one or more specified keywords indicates a location in the transcription data where a visual content item is to be added to the transcription data, displaying, via a user interface, the transcription data and visually indicate one or more locations in the transcription data that correspond to the one or more specified keywords, providing user interface controls that allow a user to specify a visual content item or a link to a visual content item for each of the one or more locations in the transcription data, and generating revised transcription data that includes the visual content item or a reference to the visual content item at each of the one or more locations in the transcription data.

14. The one or more non-transitory computer-readable media of claim 13, wherein the transcription data contains visual content identification data that identifies a visual content item to be added to the revised transcription data.

15. The one or more non-transitory computer-readable media of claim 13, wherein a location in the revised transcription data of the added visual content item or link to the visual content item corresponds to one or more locations of the one or more specified keywords.

16. The one or more non-transitory computer-readable media of claim 13, wherein:
the audio data corresponds to a plurality of visual content items or a plurality of references to visual content items based upon time, and
the user interface controls allow the user to select the visual content item or the reference to the visual content item for each of the one or more locations in the transcription data from the plurality of visual content items or the plurality of references to visual content items.

17. A computer-implemented method comprising:
at a computing device retrieving audio data that represents a plurality of spoken words,
causing the audio data to be processed to generate transcription data that provides a textual representation of the audio data,
identifying one or more specified keywords contained in the transcription data, wherein each specified keyword from the one or more specified keywords indicates a location in the transcription data where a visual content item is to be added to the transcription data,
displaying, via a user interface, the transcription data and visually indicate one or more locations in the transcription data that correspond to the one or more specified keywords,
providing user interface controls that allow a user to specify a visual content item or a link to a visual content item for each of the one or more locations in the transcription data, and
generating revised transcription data that includes the visual content item or a reference to the visual content item at each of the one or more locations in the transcription data.

18. The computer-implemented method of claim 17, wherein the transcription data contains visual content identification data that identifies a visual content item to be added to the revised transcription data.

19. The computer-implemented method of claim 17, wherein a location in the revised transcription data of the added visual content item or link to the visual content item corresponds to one or more locations of the one or more specified keywords.

20. The computer-implemented method of claim 17, wherein:
the audio data corresponds to a plurality of visual content items or a plurality of references to visual content items based upon time, and
the user interface controls allow the user to select the visual content item or the reference to the visual content item for each of the one or more locations in the transcription data from the plurality of visual content items or the plurality of references to visual content items.

* * * * *